(12) United States Patent
Kammer et al.

(10) Patent No.: US 7,719,128 B2
(45) Date of Patent: May 18, 2010

(54) SYSTEM AND METHOD FOR CONTROLLING A WIND TURBINE DURING LOSS OF GRID POWER AND CHANGING WIND CONDITIONS

(75) Inventors: Leonardo Cesar Kammer, Niskayuna, NY (US); Charudatta Subhash Mehendale, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 79 days.

(21) Appl. No.: 12/241,186

(22) Filed: Sep. 30, 2008

(65) Prior Publication Data

US 2010/0078939 A1  Apr. 1, 2010

(51) Int. Cl.
F03D 7/00 (2006.01)
(52) U.S. Cl. .............................. 290/44; 416/1
(58) Field of Classification Search ............... 290/44; 416/1
See application file for complete search history.

(56) References Cited

U.S. PATENT DOCUMENTS

| | | | | |
|---|---|---|---|---|
| 4,160,170 A | * | 7/1979 | Harner et al. | 290/44 |
| 4,329,117 A | * | 5/1982 | Doman | 416/170 R |
| 4,355,955 A | * | 10/1982 | Kisovec | 416/23 |
| 5,584,655 A | | 12/1996 | Deering | |
| 6,441,507 B1 | * | 8/2002 | Deering et al. | 290/44 |
| 7,118,339 B2 | | 10/2006 | Moroz et al. | |
| 7,476,985 B2 | * | 1/2009 | Llorente Gonzalez | 290/44 |
| 2006/0002792 A1 | * | 1/2006 | Moroz et al. | 416/1 |
| 2009/0047129 A1 | * | 2/2009 | Yoshida | 416/9 |
| 2009/0108582 A1 | * | 4/2009 | Seibers et al. | 290/44 |
| 2009/0187282 A1 | * | 7/2009 | Menke et al. | 700/287 |
| 2010/0014969 A1 | * | 1/2010 | Wilson et al. | 416/1 |

FOREIGN PATENT DOCUMENTS

| | | |
|---|---|---|
| EP | 1 696 122 | 8/2006 |
| EP | 1696122 A2 * | 8/2006 |
| WO | 2006007838 | 1/2006 |
| WO | WO 2006007838 A1 * | 1/2006 |

OTHER PUBLICATIONS

Fax from Peter Rashid sent on Jan. 28, 2010.*

* cited by examiner

*Primary Examiner*—Joseph Waks
(74) *Attorney, Agent, or Firm*—Ann M. Agosti (57) ABSTRACT

An apparatus and method for controlling a wind turbine having a plurality of blades such that the blade angle of each blade is continuously adjusted during loss of grid power relative to a wind direction relative to an orientation of the nacelle (i.e., yaw offset) and a rotor azimuth while keeping the orientation of the nacelle of the wind turbine substantially constant. The wind turbine is capable of pitching the blades a full 360 degrees and generating power from the rotation of the rotor shaft during loss of grid power.

9 Claims, 6 Drawing Sheets

SYSTEM AND METHOD FOR CONTROLLING A WIND TURBINE DURING LOSS OF GRID POWER AND CHANGING WIND CONDITIONS

BACKGROUND

This invention relates generally to wind turbines, and more particularly to a system and method for efficiently controlling wind turbines during grid loss and a change in wind conditions, especially under storm winds, to maintain the rotor speed at a substantially constant value to keep the uninterruptable power supply (UPS) active.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 80 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

The design of the blades and the tower of a wind turbine are often dimensioned by the extreme loads that occur during storm winds combined with grid loss. Even though the turbine blades are fixed at an angle close to ninety (90) degrees, they are not really in a feathered position because the lack of grid power prevents the wind turbine from yawing towards the wind direction. Extreme loads in the blades and tower are produced by the force of strong storm winds that hit a large surface area of the blade (lateral yaw direction). The storm loads may be alleviated by providing a source of secondary power, such as a diesel generator, in order to yaw the turbine towards the incoming wind. For example, one such method keeps the plane of rotation of the rotor substantially perpendicular to the direction of wind. The blade angle of the rotor blades are adjusted to a minimum operating angle close to ninety (90) degrees for spinning the rotor and the generator to produce the necessary power to turn the rotor and to keep the rotor toward the incoming wind during storm loads. However, it is desirable to alleviate the need for a separate backup generator because of the extra cost and complexity associate therewith.

In addition, the yawing of the wind turbine to keep the rotor perpendicular to the wind direction may cause undesirable cable twisting as the wind direction changes. Therefore, there is a limit on how much the wind turbine can yaw, which is usually at most about three full rotations in either direction. In addition, the yawing the turbine can only be done very slowly (about 0.5 degrees/s) due to load constraints on the turbine structure. Hence, if the wind direction changes rapidly, one will not be able to keep the rotor perpendicular to the wind direction and the strategy used in conventional wind turbines will not have the desired outcome. Therefore, it is desirable to alleviate the storm loads without the need to yaw the turbine towards the incoming wind.

SUMMARY OF THE INVENTION

Briefly, a method for controlling a wind turbine having a plurality of blades, a nacelle and a rotor, each blade having a blade angle, said method comprising continuously adjusting the blade angle of each blade during loss of grid power relative to a yaw offset and a rotor azimuth while keeping an orientation of the nacelle of the wind turbine substantially constant.

In another aspect, a wind turbine comprises a rotor, a nacelle and a plurality of blades, each blade having a blade angle, the wind turbine also comprising a control system configured to measure a pitch angle for each blade and a blade pitch drive to move the blade angle, wherein the control system continuously adjusts the blade angle of each blade during loss of grid power relative to a yaw offset and a rotor azimuth while keeping an orientation of the nacelle of the wind turbine substantially constant.

In yet another aspect, a method for controlling a wind turbine having a plurality of blades, said method comprising continuously varying a blade angle of each blade during loss of grid power such that a rotational speed of a rotor is maintained at a substantially constant value, wherein the blade angle is continuously adjusted relative to a yaw offset and a rotor azimuth according to the following equation:

$$\theta = \tan^{-1}\left(\frac{1}{\tan V_d \cdot \cos \varphi}\right),$$

where $\theta$ is the blade angle, $\varphi$ is a rotor azimuth, and $V_d$ is a wind direction relative to the nacelle orientation, also referred in this document as a yaw offset.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
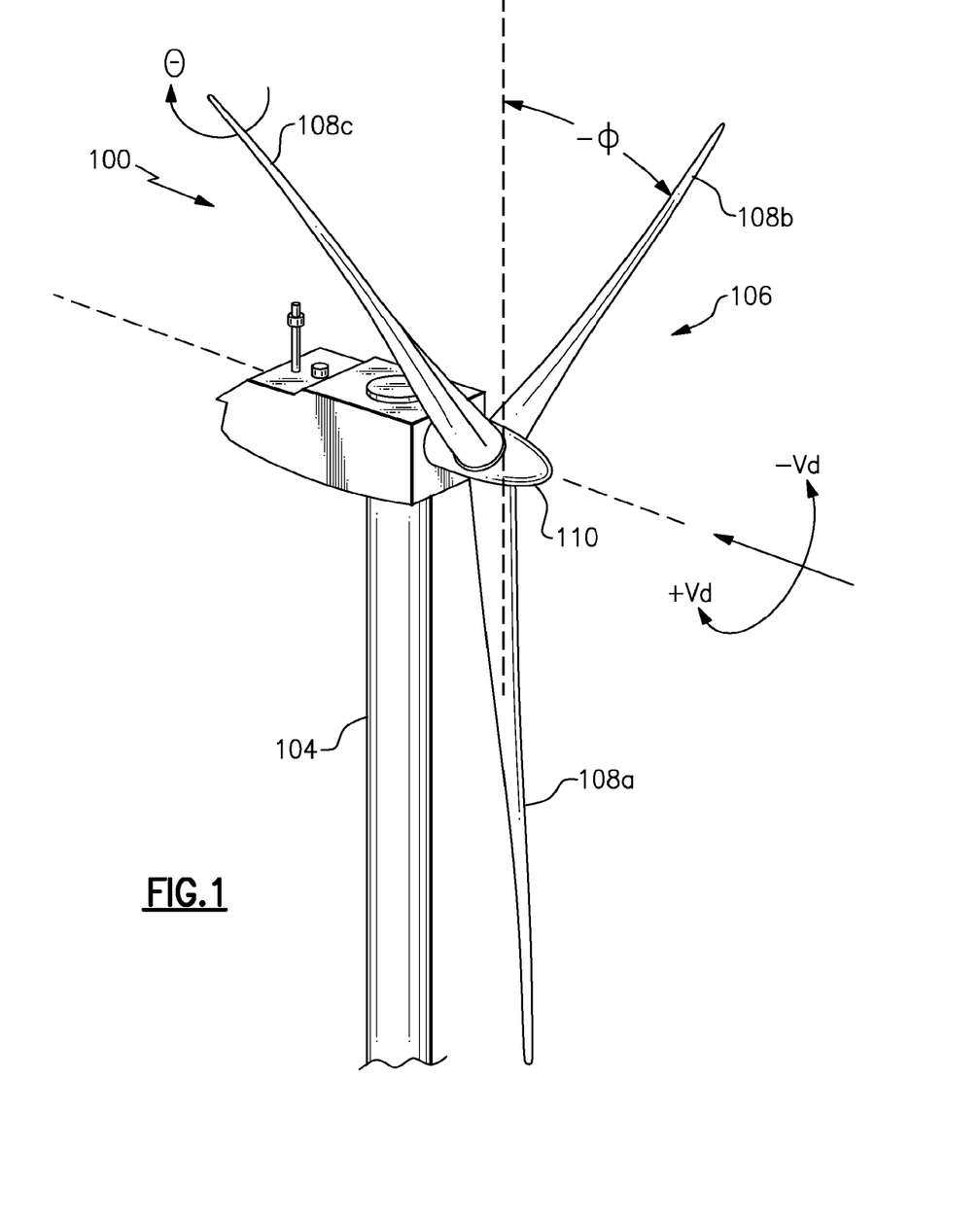
FIG. 1 is a drawing of an exemplary configuration of a wind turbine.

Referring to the drawings wherein identical reference numerals denote the same elements throughout the various views, Referring now to FIG. 1, a wind turbine 100 in some configurations comprises a nacelle 102 mounted atop a tall tower 104, only a portion of which is shown in FIG. 1. The wind turbine 100 also comprises a rotor 106 that includes a plurality of rotor blades 108a, 108b and 108c attached to a rotating hub 110. Although the wind turbine 100 illustrated in FIG. 1 includes three rotor blades, there are no specific limits on the number of rotor blades 108 required by the invention.

Figure 2:
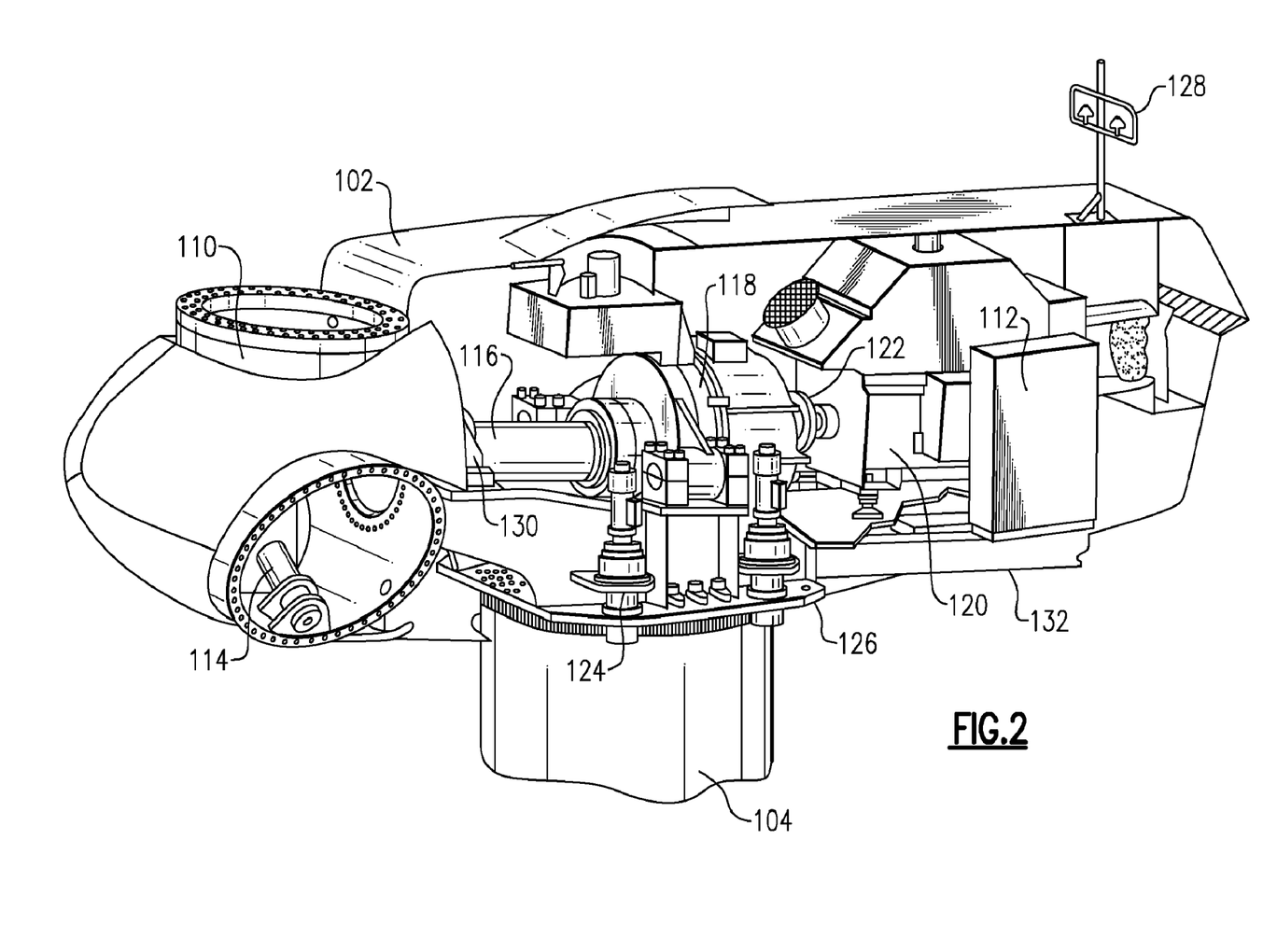
FIG. 2 is a cut-away perspective view of a nacelle of the exemplary wind turbine configuration shown in FIG. 1.

Referring now to FIG. 2, various components are housed in the nacelle 102 atop the tower 104 of the wind turbine 100. The height of the tower 104 is selected based upon factors and conditions known in the art. In some configurations, one or more microcontrollers within the control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

The control system provides control signals to a variable blade pitch drive 114 to control the pitch of blades 108 (not shown in FIG. 2) that drive the hub 110 as a result of wind. In the illustrated embodiment, the hub 110 receives three blades 108, but other configurations can utilize any number of blades. The pitches of the blades 108 are individually controlled by blade pitch drive 114. The hub 110 and blades 108 together comprise wind turbine rotor 106.

In case of loss of grid power, it would be desirable to be able to control the pitch of blades 108 to assist with braking and regulation of rotor speed. Therefore, it is desirable that an auxiliary power supply (not shown) is provided in or near the turbine 100 to provide emergency backup power for the variable blade pitch drive 114. Battery packs (not shown) may be provided in the hub 110 to provide backup power to the variable blade pitch drive 114 for each of the blades 108.

The drive train of the wind turbine includes a main rotor shaft 116 (also referred to as a "low speed shaft") connected to the hub 110 and a gear box 118 that, in some configurations, utilizes a dual path geometry to drive a high speed shaft enclosed within gear box 118. The high speed shaft (not shown in FIG. 2) is used to drive a generator 120. In some configurations, rotor torque is transmitted by a coupling 122. The generator 120 may be of any suitable type, for example, a wound rotor induction generator. In some configurations, a gearbox is not used, and instead, the rotor shaft 116 directly drives the generator 120.

A yaw drive 124 and a yaw deck 126 provide a yaw orientation system for wind turbine 100. In some configurations, the yaw orientation system is electrically operated and controlled by the control system in accordance with information received from a wind vane 128. In some configurations, the yaw system is mounted on a flange provided atop tower 104.

Figure 3:
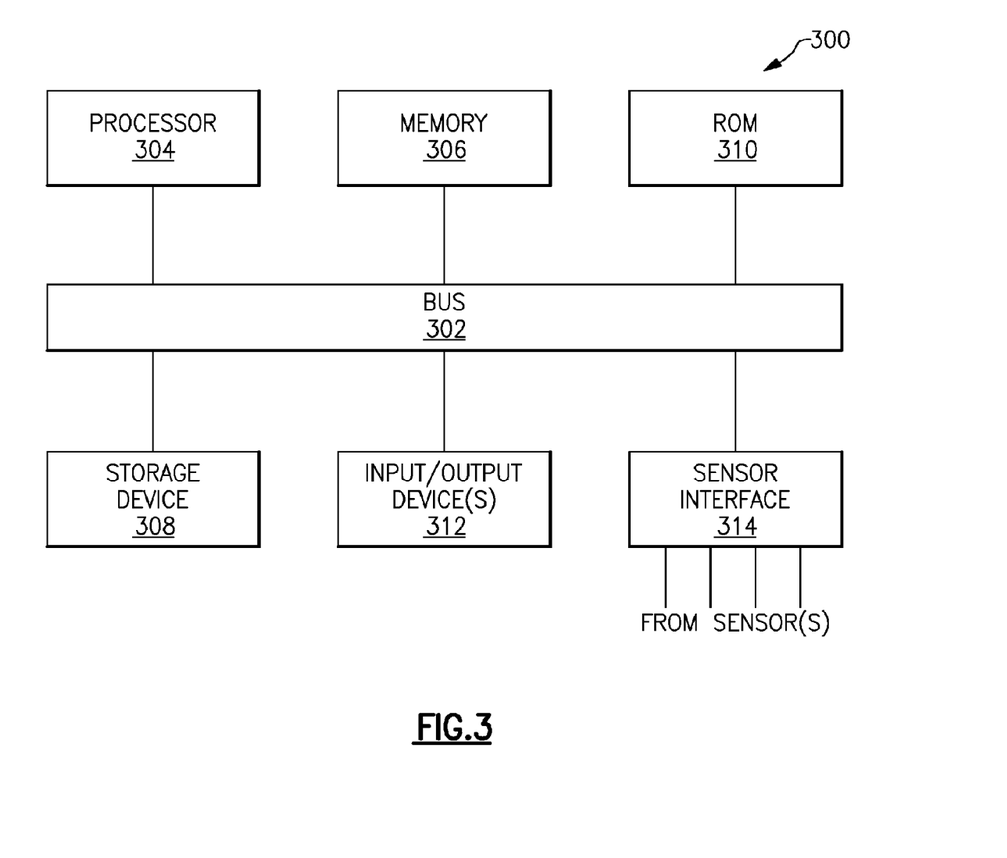
FIG. 3 is a block diagram of an exemplary configuration of a control system for the wind turbine configuration shown in FIG. 1.

Referring now to FIG. 3, a control system 300 for the wind turbine 100 includes a bus 302 or other communications device to communicate information. Processor(s) 304 are coupled to the bus 302 to process information, including information from sensors configured to measure displacements or moments. The control system 300 further includes random access memory (RAM) 306 and/or other storage device(s) 308. The RAM 306 and storage device(s) 308 are coupled to the bus 302 to store and transfer information and instructions to be executed by processor(s) 304. RAM 306 (and also storage device(s) 308, if required) can also be used to store temporary variables or other intermediate information during execution of instructions by processor(s) 304. The control system 300 can also include read only memory (ROM) and or other static storage device 310, which is coupled to the bus 302 to store and provide static (i.e., non-changing) information and instructions to processor(s) 304. The input/output device(s) 312 can include any device known in the art to provide input data to the control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, and the like. In some embodiments, hard-wired circuitry can be used in place of or in combination with software instructions. Thus, execution of sequences of instructions is not limited to any specific combination of hardware circuitry and software instructions. The sensor interface 314 is an interface that allows the control system 300 to communicate with one or more sensors. The sensor interface 314 can be or can comprise, for example, one or more analog-to-digital converters that convert analog signals into digital signals that can be used by the processor(s) 304.

An aspect of the invention is a system and method that uses full span pitch (0-360 degrees) to achieve optimal pitch profiles for different wind conditions. In case of extreme storm winds, the full span pitching allows the blades to be in "feathered" position. The "feathered" position corresponds to blade pitch angle that minimizes loading on the blades, and thus on the nacelle, bedplate, tower, and other components of the wind turbine. A preferred interpretation of the "feathered" position is when the significant outer sections of the blades have an Angle of Attack (AoA) close to the zero lift AoA. Clearly, achieving a "feathered" position for different wind directions necessitates full span pitching. In a preferred setting, the AoA at significant blade sections, wind direction, wind speed, rotor speed and azimuth position are sensed and/or estimated and a control algorithm is used to actively pitch the blade in order to maintain a desired optimal AoA while keeping an orientation of the nacelle of the wind turbine substantially constant.

The invention uses an uninterruptable power supply (UPS) in the absence of a grid connection to provide power to the blade pitch drive 114. The UPS may comprise, for example, the backup battery, and the like. The use of an UPS may slightly change the desired optimal AoA such that a minimum rotor speed may be maintained. In addition, rotor speed may act as a surrogate for AoA measurements/estimates. Pitching the blades 108 to achieve a predetermined (typically low) rotational speed of the rotor 116 achieves significant structural loads reduction during extreme wind conditions. In addition, the rotation of the rotor 116 allows the UPS to provide electrical power to the blade pitch drive 114. In one embodiment, the angle of the blades 108 are continuously varied using the UPS to maintain the rotor 116 at a substantially constant rotational speed of about 0.1 rad/s. It will be appreciated that the illustrated embodiment is not limited by the predetermined substantially constant rotor speed, and that the invention can be practiced with any desirable predetermined substantially constant rotor speed to generate a sufficient amount of electrical power for the wind turbine. For example, a substantially constant rotor speed up to about 0.5 rad/s may be selected. Further, sensors (load, strain, displacement, acceleration, etc.) in the blades, blade root/flange, hub, pitch motors/gearboxes, low speed shaft may also be used to derive information about the AoA deviations from the optimum and to make appropriate pitch corrections.

The pitch angle, θ, of each blade 108 is calculated as a combination of three effects; 1) blade feathering, 2) speed regulation, and 3) tower damping. In some cases, the effect of tower damping may not be necessary. The blade feathering (minimum blade loading) is a function of the rotor azimuth, φ, and the wind direction relative to the nacelle orientation (yaw offset), $V_d$. The calculation of the blade angle that achieves feathering is based on trigonometric expression that aligns the plane of the blade with the direction of the wind and can be expressed as:

$$\theta = \tan^{-1}\left(\frac{1}{\tan V_d \cdot \cos\varphi}\right) \quad \text{(Eq. 1)}$$

The rotor speed regulation takes into account the yaw offset and the measurement (or estimation) of the rotor (or generator) speed in order to calculate blade pitch corrections to maintain the rotor speed substantially constant. The tower damping utilizes measurements (or estimation) of tower-top fore-aft and/or side-to-side accelerations and the yaw offset in order to calculate appropriate blade pitch actuation in order to dampen tower-top oscillations.

Figure 4A:
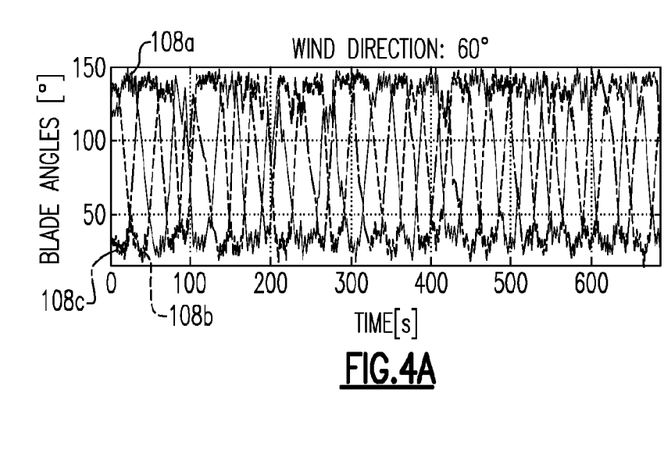
FIGS. 4A and 4B are graphical representations of blade angle as a function of time and rotor speed as a function of time, respectively, for a yaw offset of about 60 degrees.
Figure 4B:
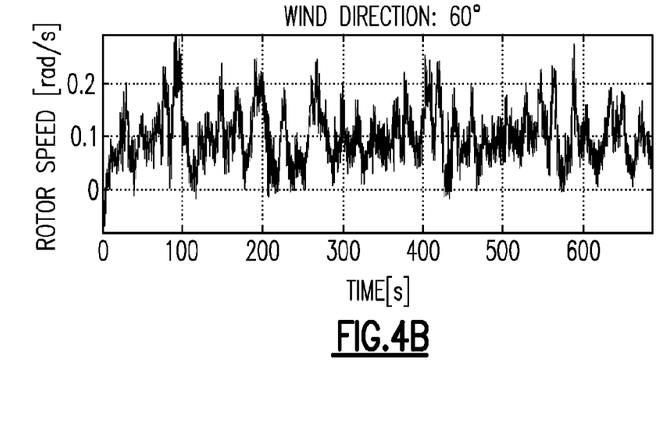
Figure 5A:
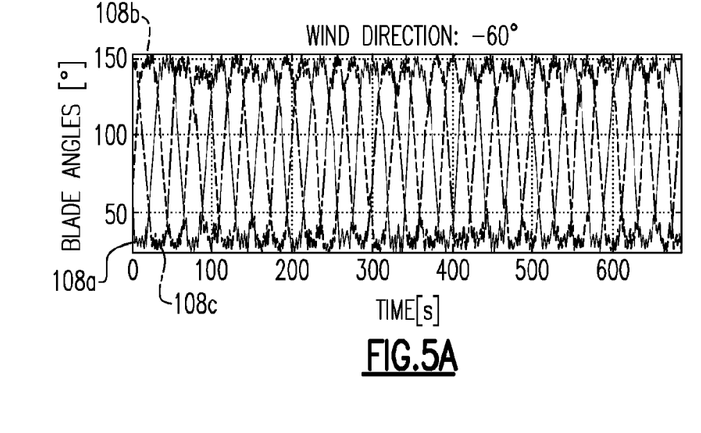
FIGS. 5A and 5B are graphical representations of blade angle as a function of time and rotor speed as a function of time, respectively, for a yaw offset of about −60 degrees.
Figure 5B:
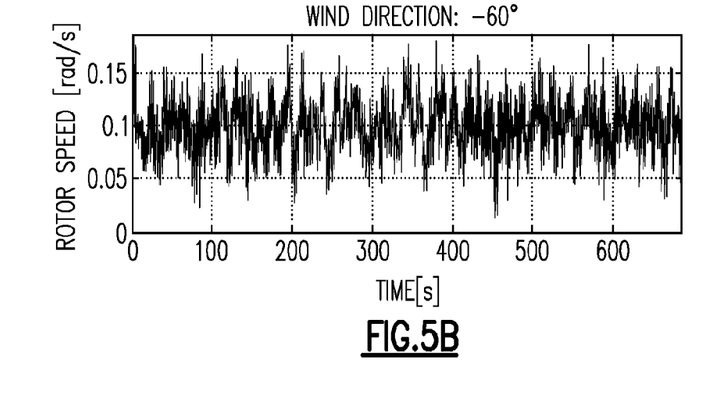

Several simulations of the control algorithm for continuous pitching of the blades 108 for various changes in wind conditions were conducted to verify the system and method of the invention. FIGS. 4 and 5 are graphical representations of the results of the control algorithm of the invention for the scenario in which the yaw offset lies at about +60 degrees and −60 degrees, respectively, during loss of grid power. As seen in FIGS. 4 and 5, the pitch angle of the blades 108 continuously adjusted in a range between a minimum of about 0 degrees and a maximum of about 150 degrees to maintain a substantially constant rotor speed of about 0.1 rad/s.

Figures 6A, 7A:
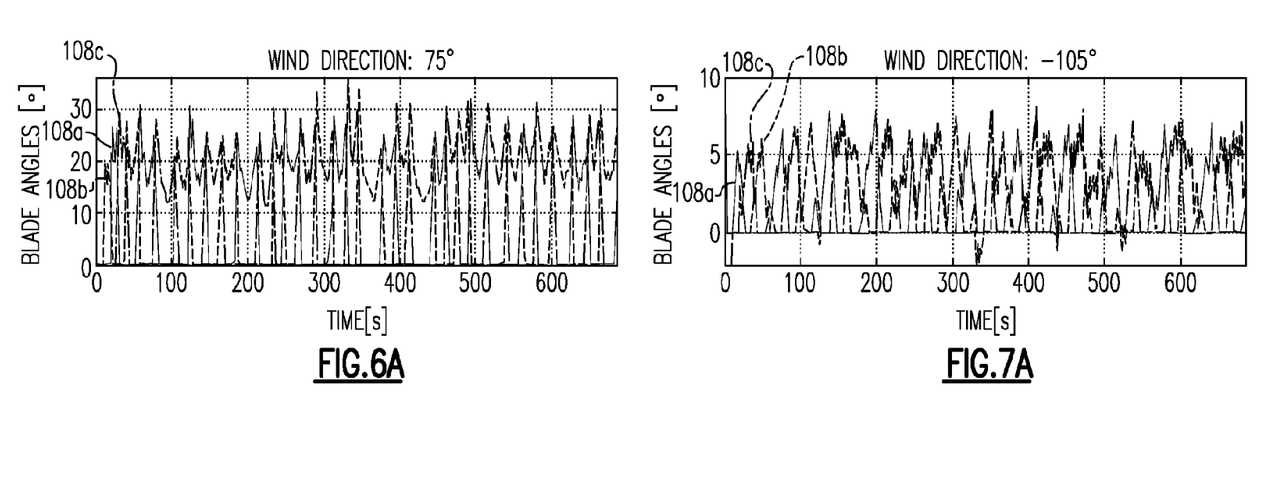
FIGS. 6A and 6B are graphical representations of blade angle as a function of time and rotor speed as a function of time, respectively, for a yaw offset of about 75 degrees.
FIGS. 7A and 7B are graphical representations of blade angle as a function of time and rotor speed as a function of time, respectively, for a yaw offset of about −75 degrees.
Figures 6B, 7B:
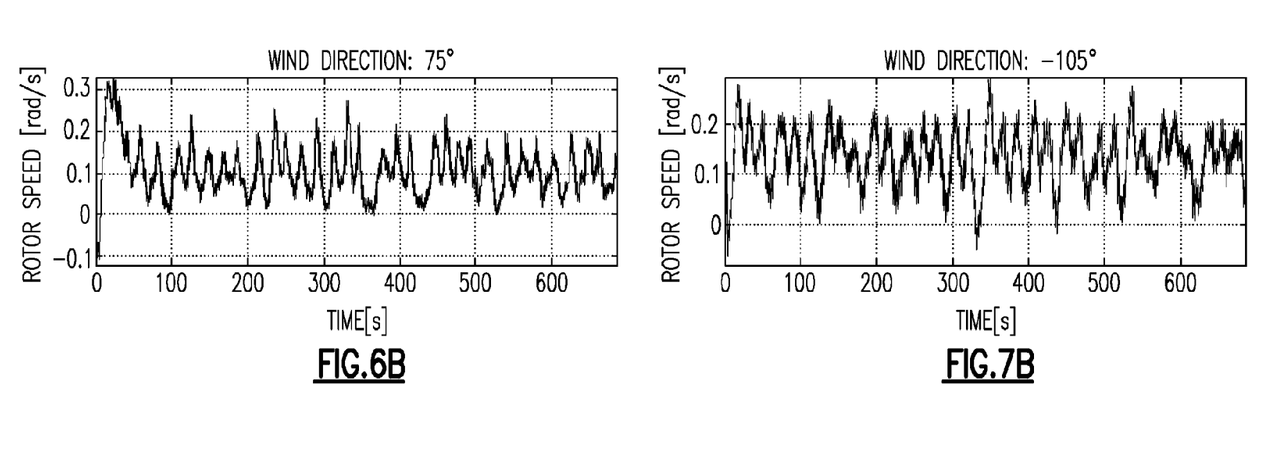

FIGS. 6 and 7 are graphical representations of the results of the control algorithm of the invention for the scenario in which the yaw offset lies at about +75 degrees and about −105 degrees, respectively. In this scenario, the direction of the wind is substantially from the side of the wind turbine 100. As a result, the control algorithm of the invention uses the surface area of the blade to push the blade 108. Note that the "normal" blade angle is 0 degrees. As seen in FIG. 6, the angle of the blades 108 continuously vary in a range between about 0 degrees and about 30 degrees to maintain a substantially constant rotor speed of about 0.1 rad/s when the wind changes direction to about 75 degrees. As seen in FIG. 7, the pitch angle of the blades 108 continuously adjusted in a range between about 0 degrees and about 7 degrees to maintain a substantially constant rotor speed of about 0.1 rad/s when the wind changes direction near −105 degrees. It should be understood that the pitch angle of the blades 108 will continuously adjusted between about 0 degrees and in the range between about 7 degrees and about 30 degrees when the wind changes direction around +75 degrees, and around −105 degrees to maintain a substantially constant rotor speed of about 0.1 rad/s.

Figure 8A:
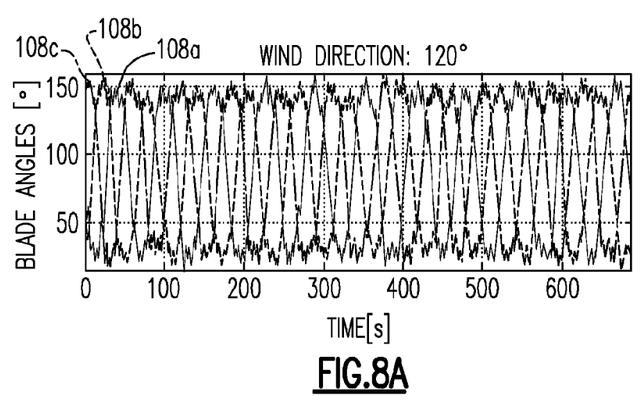
FIGS. 8A and 8B are graphical representations of blade angle as a function of time and rotor speed as a function of time, respectively, for a yaw offset of about 120 degrees.
Figure 8B:
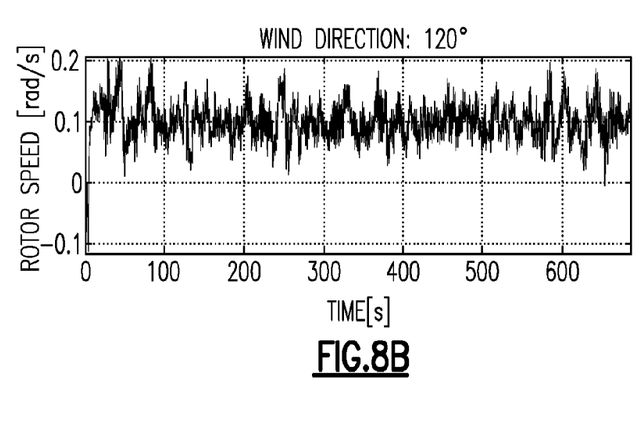
Figure 9A:
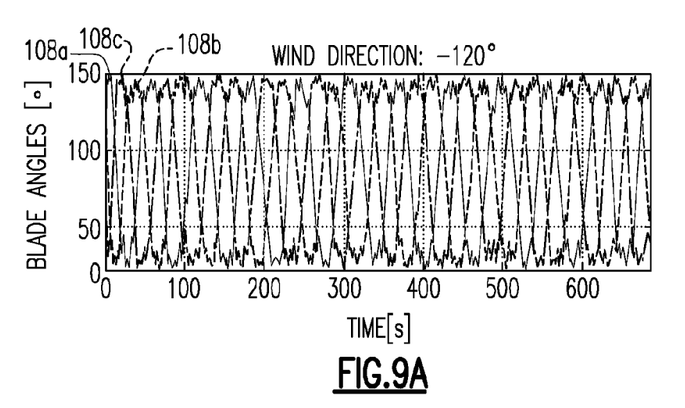
FIGS. 9A and 9B are graphical representations of blade angle as a function of time and rotor speed as a function of time, respectively, for a yaw offset of about −120 degrees.
Figure 9B:
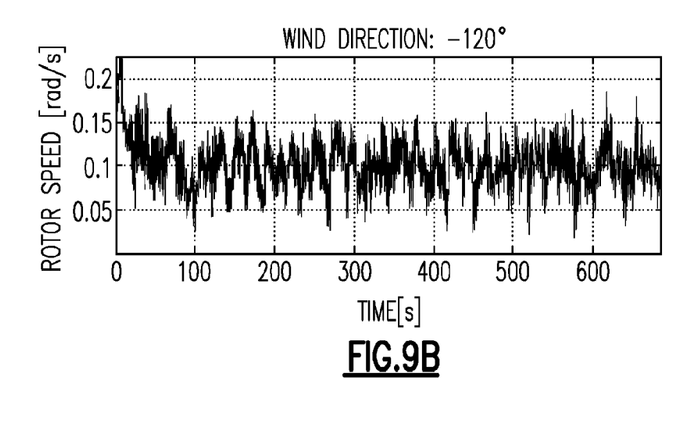

FIGS. 8 and 9 are graphical representations of the results of the control algorithm of the illustrated embodiment for the scenario in which the yaw offset lies at about +120 degrees and about −120 degrees, respectively. As seen in FIGS. 8 and 9, the pitch angle of the blades 108 continuously adjusted in a range between a minimum of about 0 degrees and a maximum of about 150 degrees to maintain a substantially constant rotor speed of about 0.1 rad/s. It is noted that this scenario is similar to the scenario in which the yaw offset changes near +60 degrees and near −60 degrees, as shown in FIGS. 4 and 5.

As described above, the illustrated embodiment provides a simple control algorithm for continuously varying the blade pitch during grid loss and a change in wind conditions.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a wind turbine having a plurality of blades, a nacelle and a rotor, each blade having a blade angle, said method comprising continuously adjusting the blade angle of each blade during loss of grid power relative to a yaw offset and a rotor azimuth while keeping an orientation of the nacelle of the wind turbine substantially constant, wherein each blade angle is continuously adjusted according to the following:

θ=tan⁻¹(1/tan $V_d$·cos φ), where θ is the blade angle, $V_d$ is the yaw offset, and φ is the rotor azimuth.

2. The method of claim 1, wherein the wind turbine is provided with electrical energy from an uninterruptible power supply to selectively adjust the blade angle of each blade during loss of grid power.

3. The method of claim 1, wherein the blade angle is utilized to control a rotational speed of the rotor at a substantially constant, non-zero reference value, thereby providing electrical power to the wind turbine.

4. The method of claim 1, wherein the substantially constant, non-zero reference value in a range between about 0.1 rad/s and about 0.5 rad/s.

5. A wind turbine comprising a rotor, a nacelle, a plurality of blades, a control system configured to measure a blade angle for each blade, and a blade pitch drive to move the blade angle, wherein the control system continuously adjusts the blade angle of each blade during loss of grid power relative to a yaw offset and a rotor azimuth while keeping an orientation of the nacelle of the wind turbine substantially constant, wherein each blade angle is continuously adjusted according to the following:

θ=tan⁻¹(1/tan $V_d$·cos φ), where θ is the blade angle, $V_d$ is the yaw offset, and φ is the rotor azimuth.

6. The wind turbine of claim 5, wherein the wind turbine is provided with electrical energy from an uninterruptible power supply to selectively adjust the blade angle of each blade during loss of grid power.

7. The wind turbine of claim 5, wherein the blade angle is further adjusted such that a rotational speed of the rotor is maintained at a substantially constant, non-zero reference value, thereby providing electrical power to the wind turbine.

8. The wind turbine of claim 5, wherein the substantially constant, non\-zero reference value in a range between about 0.1 rad/s and about 0.5 rad/s.

9. A method for controlling a wind turbine having a plurality of blades, said method comprising continuously varying a blade angle of each blade during loss of grid power such that a rotational speed of a rotor is maintained at a substantially constant non-zero reference value, wherein the blade angle is continuously adjusted relative to a yaw offset and a rotor azimuth while keeping an orientation of a nacelle of the wind turbine substantially constant according to the following equation:

$$\theta = \tan^{-1}\left(\frac{1}{\tan V_d \cdot \cos \varphi}\right),$$

where $\theta$ is the blade angle, $V_d$ is the yaw offset, and $\varphi$ is the rotor azimuth.

* * * * *